United States Patent
Ahmad et al.

(10) Patent No.: US 12,518,100 B1
(45) Date of Patent: Jan. 6, 2026

(54) SYSTEMS AND METHODS TO TRAIN AND UTILIZE AN ENTITY RECOGNITION MODEL TO GENERATE CONTENT BLOCK RECOMMENDATIONS FOR A NOTE

(71) Applicant: Suki AI, Inc., Redwood City, CA (US)

(72) Inventors: Feroz Ahmad, Sunnyvale, CA (US); Belwadi Srikanth, Santa Clara, CA (US); Punit Soni, Los Altos, CA (US); Matt Pallakoff, Mountain View, CA (US); Alexa Bisinger, Naperville, IL (US)

(73) Assignee: Suki AI, Inc., Redwood City, CA (US)

( * ) Notice: Subject to any disclaimer, the term of this patent is extended or adjusted under 35 U.S.C. 154(b) by 159 days.

(21) Appl. No.: 18/466,665

(22) Filed: Sep. 13, 2023

(51) Int. Cl.
*G06F 40/295* (2020.01)
*G16H 10/60* (2018.01)
*G16H 40/20* (2018.01)

(52) U.S. Cl.
CPC ........... *G06F 40/295* (2020.01); *G16H 10/60* (2018.01); *G16H 40/20* (2018.01)

(58) Field of Classification Search
CPC ....... G06F 40/295; G16H 40/20; G16H 10/60
USPC .......................................................... 704/9
See application file for complete search history.

(56) References Cited

U.S. PATENT DOCUMENTS

| | | | |
|---|---|---|---|
| 10,095,692 B2 * | 10/2018 | Song | G06F 40/56 |
| 10,299,680 B2 * | 5/2019 | Hübinette | A61B 5/02007 |
| 10,410,139 B2 * | 9/2019 | Kanani | G06N 20/00 |
| 10,635,751 B1 * | 4/2020 | Relangi | G06F 40/35 |
| 11,030,407 B2 * | 6/2021 | Hagiwara | G06F 40/58 |
| 11,238,228 B2 * | 2/2022 | Relangi | G06F 40/295 |
| 2018/0203843 A1 * | 7/2018 | Mehdad | G06F 40/295 |
| 2023/0077849 A1 * | 3/2023 | Xu | G06F 40/279 |
| | | | 382/190 |

(Continued)

FOREIGN PATENT DOCUMENTS

WO WO-2005116866 A1 * 12/2005 ............. G06N 20/10

OTHER PUBLICATIONS

Dong et al., "A Multiclass Classification Method Based on Deep Learning for Named Entity Recognition in Electronic Medical Record" (Year: 2016).*

(Continued)

*Primary Examiner* — Richemond Dorvil
(74) *Attorney, Agent, or Firm* — Esplin & Associates, PC

(57) ABSTRACT

Systems and methods to utilize a trained entity recognition model to generate content block recommendations for a note are disclosed. Exemplary implementations may: determine, from note templates stored in electronic storage, a note template to implement for a note based on first current visit information for a scheduled visit for a first subject; provide an information set as the text inputs to the trained entity recognition model; obtain, from the entity recognition model, the categorized entities; determine recommendation template(s) to utilize for configuring content in the note; provide the categorized entities and the recommendation template(s) to a large language model to generate content block recommendations for sections of the note; obtain the content block recommendations; generate the note that includes the content block recommendations; and effectuate, via a client computing platform, presentation of the note.

12 Claims, 5 Drawing Sheets

(56) References Cited

U.S. PATENT DOCUMENTS

2024/0273297 A1\* 8/2024 Li .................... G06F 40/295

OTHER PUBLICATIONS

Das et al., "Zero-shot Learning for Named Entity Recognition in Software Specification Documents" (Year: 2023).\*

Tianyu Liu, Yuchen Eleanor Jiang, Nicholas Monath, Ryan Cotterell, and Mrinmaya Sachan. 2022. "Autoregressive Structured Prediction with Language Models". In Findings of the Association for Computational Linguistics: EMNLP 2022 (13 pages).

Xinyu Wang, Yong Jiangy, Nguyen Bachy, Tao Wangy, Zhongqiang Huangy, Fei Huangy, and Kewei Tu, "Automated Concatenation of Embeddings for Structured Prediction"; Aug. 2021; Proceedings of the 59th Annual Meeting of the Association for Computational Linguisticsand the 11th International Joint Conference on Natural Language Processing, (pp. 2643-2660).

\* cited by examiner

SYSTEMS AND METHODS TO TRAIN AND UTILIZE AN ENTITY RECOGNITION MODEL TO GENERATE CONTENT BLOCK RECOMMENDATIONS FOR A NOTE

FIELD OF THE DISCLOSURE

The present disclosure relates to systems and methods to train and utilize an entity recognition model to generate content block recommendations for a note.

BACKGROUND

A visit to a care provider, such as a doctor, by a subject may involve careful documentation of a clinical note for the visit. The clinical note for the visit may include basic information about the subject and/or relevant information regarding the subject and the visit. The documentation process for establishing the clinical note with the basic and/or relevant information may typically be completed manually by the care provider or other personnel. This clinical note establishment may be time consuming and require tedious manipulation of a computing platform (e.g., smart device) used to generate the clinical notes.

SUMMARY

One aspect of the present disclosure relates to a system configured to utilize a trained entity recognition model to generate content block recommendations for a note. One aspect of the present disclosure relates to a system configured to train an entity recognition model to identify entities within unformatted text. The system may include one or more hardware processors configured by machine-readable instructions, electronic storage, and/or other components. The machine-readable instructions may include one or more instruction components. The instruction components may include computer program components. The instruction components may include one or more of model training component, model storing component, note template determining component, entity recognition component, recommendation generating component, note generating component, presentation component, and/or other instruction components.

The electronic storage may store at least the entity recognition model, training information, a recommendation template classifier, electronic records of subjects, visit information for the subjects, entity classes, note templates, recommendation templates, and/or other information. The training information may include entity classes related to a medical knowledge domain, unformatted text related to the medical knowledge domain, entities within the unformatted text categorized in individual ones of the entity classes, and/or other training information. The visit information may include past visit information for past visits of the subjects and current visit information for scheduled visits that are for the subjects.

The model training component may be configured to obtain an entity recognition model from the electronic storage. The model training component may be configured to obtain the training information from the electronic storage. The model training component may be configured to train the entity recognition model to categorize entities within unformatted text inputs by using the unformatted text as training inputs and the entities categorized in the individual entity classes as the training outputs such that the entity recognition model is trained to identify the entities and categorize the entities in the individual entity classes.

The model storing component may be configured to store the trained entity recognition model to the electronic storage. Thus, the electronic storage may further store the trained entity recognition model, and/or other information. The trained entity recognition model may be configured to identify and categorize entities within unformatted text inputs.

The note template determining component may be configured to determine, from note templates stored in the electronic storage, a note template to implement for a note based on first current visit information for a scheduled visit of a first subject, and/or other information stored in electronic storage or accessible by the instruction components.

The entity recognition component may be configured to provide an information set as the text inputs to the trained entity recognition model. The information set may include a first electronic medical record of the first subject and the first current visit information, first past visit information for the first subject, and/or other information as the text inputs. The entity recognition component may be configured to obtain, from the trained entity recognition model, the categorized entities. Individual ones of the categorized entities may include the entity class and the entity.

The recommendation template classifier may be configured to determine one or more of the recommendation templates to utilize for configuring content appropriate for population in the one or more note sections of the note. Determining the one or more recommendation templates may be based on the first current visit information, the categorized entities, the determined note template, and/or other information.

The recommendation generating component may be configured to provide at least the categorized entities and the one or more recommendation templates to a large language model to generate content block recommendations for sections of the note template. The sections of the note may be based on note sections included in the note template.

The note generating component may be configured to obtain the content block recommendations for the sections of the note from the large language model. The note generating component may be configured to generate the note including the content block recommendations in the sections.

The presentation component may be configured to effectuate, via a client computing platform, presentation of the note.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1A:
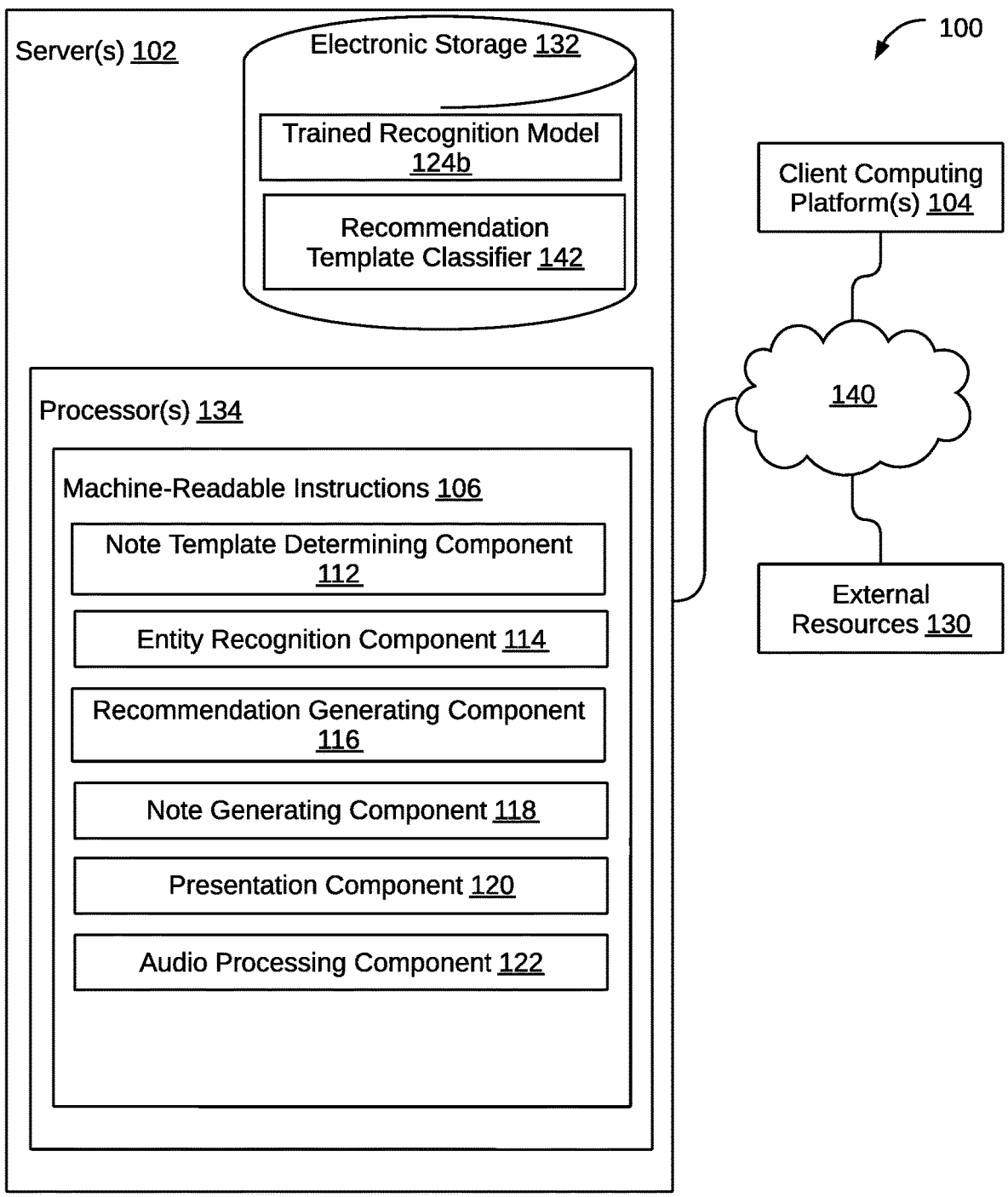
FIG. 1A-B illustrates a system configured to train and utilize an entity recognition model to generate content block recommendations for a note, in accordance with one or more implementations.
Figure 1B:
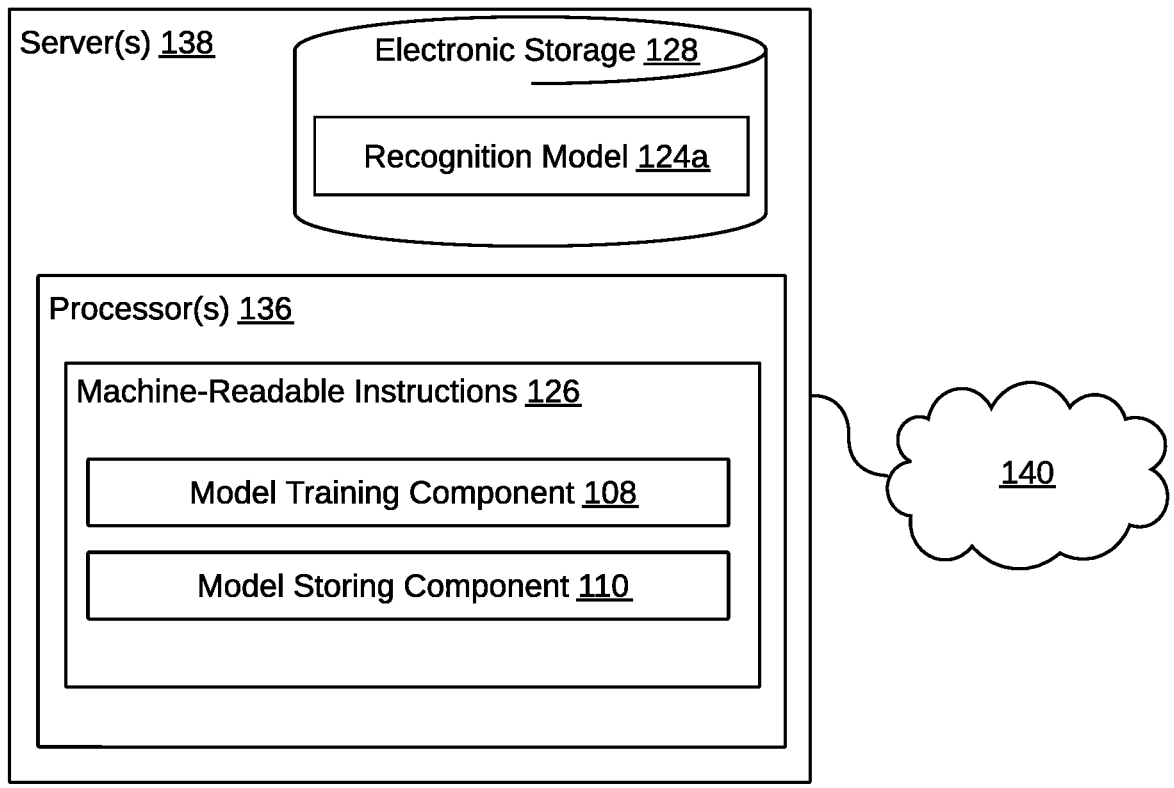

FIG. 1A-B illustrate a system 100 configured to train and utilize an entity recognition model to generate content block recommendations for a note, in accordance with one or more implementations. In some implementations, system 100 may include one or more servers 138 of FIG. 1B, electronic storage 136 of FIG. 1B, one or more servers 102, electronic storage 132, and/or other components. Server(s) 102 may be configured to communicate with one or more client computing platforms 104 via network 140 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Referring to FIG. 1B, electronic storage 128 may be similar to electronic storage 132 of FIG. 1A described herein, but included in server(s) 138. In some implementations, electronic storage 128 and electronic storage 132 may communicate via network 140 (the same as in FIG. 1A) or may be the same storage media, and thus store the same information.

Electronic storage 128 may store at least an entity recognition model 124b, training information, and/or other information. The training information may include entity classes related to a medical knowledge domain, unformatted text related to the medical knowledge domain, entities within the unformatted text categorized in individual ones of the entity classes, and/or other training information.

The unformatted text may include transcripts generated based on audio information that represents dictations from users, typed notes input by the users, and/or other unformatted text. The users may be a primary caregiver (e.g., a doctor, physician assistant, nurse), administrative personnel, and/or other users. The typed notes may be manually provided via client computing platforms 104 and/or input devices (e.g., physical keyboard). The input devices may include a keyboard, a mouse, a touchscreen that displayed a virtual keyboard, and/or other input devices.

The entity classes may be different sets of related features and parameters that are described and included in notes. The notes may include medical notes, legal notes, mechanical notes, and/or notes specific to other knowledge domains.

The entity classes and notes described herein may be related to the medical knowledge domain for exemplary purposes and is not intended to be limiting. The medical knowledge domain may refer to terms, phrases, entities, literature, transcripts, values, and/or other information that are related to medicine. However, other knowledge domains may be utilized additionally or alternatively such as education, auto mechanics, among others. By way of non-limiting example, the entity classes may include at least complaints, allergies, conditions, medications, procedures, medical devices, and/or other entity classes. In some implementations, the entity classes stored may be modified by the users adding and/or removing one or more entity classes via client computing platforms 104.

The entities within the unformatted text categorized in the individual entity classes may include, for example, breathlessness, tiredness, fatigue, pain, fever, swelling, rashes for the complaints entity class. As another example, the entities for the allergies entity class may include tree nuts, soy, gluten, dairy, among other allergies. As another example, the entities for the conditions entity class Alzheimer's, arthritis, chickenpox, diabetes, pneumonia, tonsillitis The entities for the medications entity class Tylenol, Aleve, Atenolol, Tenormin, among other conditions. As another example, the entities for the procedures entity class appendectomy, cataract surgery, colectomy, knee replacement, among other procedures. As another example, the entities for the medical devices entity class crutch, pacemaker, pulse oximeter, ventilator, among other medical devices.

Server(s) 138 that may be configured by machine-readable instructions 126 of processor(s) 136. Machine-readable instructions 126 may include one or more instruction components. As described herein, server(s) 138 may be similar to server(s) 102 of FIG. 1A, machine-readable instructions 126 may be similar to machine-readable instructions 106 of FIG. 1A, and processor(s) 136 may be similar to processor(s) 134 of FIG. 1A, but executed by server(s) 138. The instruction components may include one or more of model training component 108, model storing component 110, and/or other instruction components. In some implementations, components 108 and/or 110 may be included as machine-readable instructions 106, therefore the functionality of all the components are executed by server(s) 102. In some implementations, components 112, 114, 116, 118, 120, and/or 122 may be included as machine-readable instructions 126, therefore the functionality of all the components are executed by server(s) 138.

Model training component 108 may be configured to obtain the training information from electronic storage 128. Furthermore, model training component 108 may be configured to obtain entity recognition model 124a from electronic storage 128. Entity recognition model 124a may be trained to identify and categorize entities included in text inputs. The text inputs may include obtained transcripts generated based on audio information that represents dictations from one or more of the users, obtained transcripts generated based on audio information that represents dictations from subjects, textual input provided by the one or more users, textual input provided by the subjects, and/or other text that are input to trained entity recognition model 124b. The text inputs may be formatted or unformatted. The formatted text inputs may be organized or structured textual information (e.g., electronic records, notes). The unformatted text inputs may be textual information (e.g., transcripts) that are not organized and structured according to a template or structure.

Model training component 108 may be configured to train entity recognition model 124a to identify and categorize entities within the text inputs by using the unformatted text as training inputs and the entities categorized in the individual entity classes as the training outputs. The training inputs and the training outputs may be information that are closely correlated. That is, for example, a reoccurring training input, e.g., text, may correspond to a training output that is often categorized into a particular entity class. Thus, such training input and training output may be closely correlated. As such entity recognition model 124a may be trained to identify the entities and categorize the entities in the individual entity classes. Trained entity recognition model 124b may be the same as entity recognition model 124a but subsequent to training as described herein.

Entity recognition model 124a may be trained based on the training inputs, the training outputs, and/or other information by using known and/or novel machine learning techniques and/or other training techniques. In some implementations, entity recognition model 124a may be continuously or periodically trained based on the training information as more of the training information is obtained and stored to electronic storage 128, and/or as model training component 108 obtains access to other electronic storage. That is, while entity recognition model 124a is not being employed (i.e., trained entity recognition model 124b herein), entity recognition model 124a may be continuously trained based on the training information and/or other information. In some implementations, entity recognition model 124a may be trained periodically every week, every month, or other period of time, or at a point in time that new training information is obtained or accessible.

In some implementations, trained entity recognition model 124b may include a Transformer-based neural network architecture. In some implementations, entity recognition model 124a may be trained to generate a target structure by effectuating a set of actions such that the set of actions to generate the target structure represents the target structure itself. The structure may be an entity (e.g., abdomen). The entity may be a span of interest amongst the unformatted text. The set of actions may include structure-building actions, bracket-pairing actions, span-labeling actions, and/or other actions. The structure-building actions may enable encoding text of an entity between symbols, e.g., an open bracket and a closed bracket, with a copy of the text of the entity in between the symbols. As such, the symbols and the copy may enable building a given structure. The bracket-pairing actions may enable matching the symbols, e.g., open bracket and the closed bracket. The span-labeling actions may enable encoding labeling of a span, i.e., entity, with one of the entity classes.

In some implementations, entity recognition model 124a may be trained to analyze the unformatted text and individual textual terms (e.g., left arm) thereof according to stored effectiveness values for the individual textual terms, or types of the textual terms (e.g., noun, preposition, adjective). The effectiveness values represent how suitable the individual textual terms, or its type, are for categorization into the entity classes. Meaning, it is determined whether each textual term is an entity that may be categorized in one of the entity classes. The effectiveness values, and thus entity recognition model 124a may be tuned based on accuracy of its analysis with respect to the entities categorized in the individual entity classes, i.e., the training outputs.

Model storing component 110 may be configured to store trained entity recognition model 124b, responsive to and subsequent to training entity recognition model 124a to the electronic storage 132, electronic storage 128, and/or other electronic storage.

Electronic storage 132 may store trained entity recognition model 124b, recommendation template classifier 142, electronic records of the subjects, visit information for the subjects, the entity classes, note templates, recommendation templates, and/or other information. A subject may include, by way of non-limiting example, a patient, a vehicle, a device, or other subject. In some implementations, the electronic records may include electronic medical records for patients. Individual ones of the electronic medical records may include identifying information of the subject, current medications, current allergies, current illnesses and conditions, test results, notes related to the subjects, and/or other information.

In some implementations, the individual electronic medical records may include past procedures, past notes related to the subjects, past notes related to the past visits or the past procedures, past notes related to the test results, past medications, past allergies, past illnesses and conditions, and/or other past information about the subjects. In some implementations, the past information may be stored in electronic storage 132 separately, e.g., as past electronic medical records, from the latest or current information included in the electronic medical records.

The identifying information may include a name, a birthdate, a unique identifier, an address, one or more contact phone numbers, and/or other information. In some implementations, the values to the medications, the allergies, the illnesses and conditions, the test results, and/or other information included in the electronic medical records may already be categorized into one of the entity classes. A note may include documentation of a visit or procedure for the subject.

The visit information may include past visit information and current visit information. The current visit information may define scheduled visits for the individual users. The current visit information may include a date of a visit, a time of the visit, a reason of visit, a type of visit (e.g., new patient, follow up, pre-op, post-op), one or more focuses (e.g., back pain, rash) of the visit, and/or other current visit information. In some implementations, the current visit information may be obtained via a scheduling component (not illustrated) and/or external resources 130 that facilitate with scheduling upcoming visits for the subjects and with one or more of the users. The past visit information may include the same information as the current visit information but for visits that already occurred. By way of non-limiting example, first current visit information that defines a scheduled visit for a first subject may be stored in electronic storage 132.

Individual ones of the note templates may include one or more note sections. By way of non-limiting example, the note sections may include synopsis of the subject, prescriptions, illnesses and conditions, symptoms, diagnoses, and/or other note sections. In some implementations, a note template may be customized by the users to include particular ones of the note sections and/or new note sections.

In some implementations, at least some of the note sections may include one or more parameters that individually may be intended to correspond to one or more values. In some implementations, the note templates may include default values that correspond to one or more of the parameters, which may remain or be modified by the users. In some implementations, the parameters may correspond to placeholders where values may be input. A value to a parameter may describe the state of the subject. The value(s)

for the parameter may record individual assessments and/or measurements of the parameters taken with respect to the subject such that the parameter values for the parameters define the state of the subject. By way of non-limiting example, the parameters may include height, weight, heart rate, blood pressure, color, and/or other parameters. In some implementations, the one or more parameters may be related to the note section included in. In some implementations, the one or more parameters may be its own note section.

The individual note sections included in the note templates may be associated with a recommendation template. The recommendation template may provide a configuration or arrangement for the content that may be populated in the associated note section of a note that is generated based on the corresponding note template. The arrangement for the content provided by the individual recommendation templates may include one or more text box segments for text, one or more table segments for parameters with corresponding values, one or more chart segments for displaying sets of values for individual parameters, media segments for images and/or video attachments, and/or other segments arranged in a particular manner. Thus, the content determined and populated in the individual note sections of the note may be arranged in accordance with the recommendation template.

For example, a first note template may include at least a first note section. The first note section may be associated with a first recommendation template. The first recommendation template may include a text box segment and a table segment. Thus, upon implementing the first note template so that the note is based on such, and upon determination of content that is appropriate for population in the first note section of the note, the content may be recommended to be populated in the first note section in accordance with the first recommendation template. Determination of the individual recommendation templates for the individual sections may be performed by a machine learning model described herein.

Server(s) 102 may be configured by machine-readable instructions 106. Machine-readable instructions 106 may include one or more instruction components. The instruction components may include computer program components. The instruction components may include one or more of note template determining component 112, entity recognition component 114, recommendation generating component 116, note generating component 118, presentation component 120, audio processing component 122, and/or other instruction components.

In some implementations, note template determining component 112 may be configured to determine, from the note templates stored in electronic storage 132, a note template to implement for a note based on the first current visit information for the scheduled visit of the first subject and/or other information stored in electronic storage 132 or accessible by the instruction components. In some implementations, one of the note templates may be manually or audibly selected by the user from a presented list of the note templates via client computing platform 104. Thus, in some implementations, determining the note template may include receiving the user-selected note template.

Entity recognition component 114 may be configured to provide an information set as the text inputs to trained entity recognition model 124b. The information set may include one or more of transcripts generated based on dictations related to the first subject, unformatted text provided by the users, a first electronic medical record (from electronic storage 132 and/or other electronic storage) of the first subject, the first current visit information, the first past visit information, and/or other information as the text inputs. The dictations related to the first subject may include a voicemail by the first subject, a recording by the first subject, a recording by one of the users, and/or other dictations which may be obtained from the scheduling component, external resources 130, client computing platforms 104, and/or from other sources.

Entity recognition component 114 may be configured to obtain, from trained entity recognition model 124b, the categorized entities. Individual ones of the categorized entities may include the entity itself and the entity class. In some implementations, the categorized entities may be obtained in sets for each entity class. In some implementations, the categorized entities may be obtained in chronological order that they were identified. In some implementations, entity recognition component 114 may be configured to obtain, from trained entity recognition model 124b, the categorized entities for a textualized transcript.

In some implementations, audio processing component 122 may be configured to obtain audio information that represents sounds captured by client computing platform 104 associated with the user. In some implementations, the audio information may be obtained in an ongoing manner. The term "ongoing manner", as used herein, may refer to continuing to perform an action (e.g., obtain) continuously or periodically (e.g., every 30 seconds, every minute, every hour, etc.) until receipt of an indication to terminate. That is, audio processing component 122 may be continuously determining whether the audio input devices of client computing platform 104 are detecting any sounds from participants.

The sounds may convey utterances from the participants during the scheduled visit. The participants may include the user, the first subject, and/or other participants. In some implementations, the audio information may include digital audio signals that encode the sounds of individual utterances of the participants, a recording of the individual utterances of the user, semantics of words in the individual utterances, and/or other audio information. In some implementations, the sounds of the utterances of the participants may be detected by an audio input device, such as a microphone, of client computing platform 104. In some implementations, the sounds may be converted to the digital audio signals by converting analog waves to the digital audio signals by precisely measuring the analog waves at consistent and frequent intervals. The recording of the individual utterances may include a digital file of a reproduction of the digital audio signals that cause the sounds, and thus convey the utterances, the digital audio signals, and/or other recording. The semantics may include a definition, a most common definition, common contexts, and/or other information that conveys a meaning of the words.

Audio processing component 122 may be configured to generate the textualized transcript representing the audio information. The textualized transcript may be generated by performing known and/or novel speech recognition techniques on the audio information. In some implementations, the generation of the textualized transcript may be in an ongoing manner. In some implementations, the audio information may include audio segments. The audio segments may convey the individual utterances or sets of utterances. Thus, audio processing component 122 may be configured to generate textualized transcript segments, that thus comprise the textualized transcript, based on the individual audio segments. In some implementations, audio processing component 122 may be configured to provide the textualized transcript to trained entity recognition model 124b upon generation.

Recommendation template classifier 142 may be configured to determine one or more of the recommendation templates to utilize for configuring content appropriate for population in the one or more note sections of the note. The recommendation templates may be determined based on the first current visit information for the scheduled visit of the first subject, the categorized entities, the determined note template (e.g., user selected), and/or other information from electronic storage 132 or accessible by the instruction components. Meaning, based on the determined note template, the note sections thereof, the categorized entities, the first current visit information, and/or other information, a recommendation template for each of the note sections may be determined. Recommendation template classifier 142 may be a neural network model trained based on at least the information stored in electronic storage 132 and/or other storage, information from external resources 130, and/or other information obtainable via network 140.

Recommendation generating component 116 may be configured to provide the categorized entities, the first current visit information, the determined note template, the first electronic medical record, the one or more recommendation templates, and/or other determined information or information from electronic storage 132 to the machine learning model. The machine learning model may be configured to generate one or more content block recommendations for sections of the note given the note template the note is based on. The one or more content block recommendations for the one or more note sections may be generated based on the categorized entities, the first current visit information, the determined note template, the first electronic medical record, the one or more recommendation templates, and/or other determined information or information from electronic storage 132 provided. In some implementations, the machine learning model may be a large language model. In some implementations, the machine learning model may be stored in electronic storage 132, electronic storage 128, and/or other electronic storage accessible by recommendation generating component 116. In some implementations, the machine learning model may be one of external resources 130.

In some implementations, the large language model may be Transformer-based which has been previously trained on a plurality of generic information to generate output text based on input text received. The large language model may be Encoder-Decoder based with a plurality of model parameters where the large language model is trained on a variety of language tasks. The large language model may utilize both the Encoder and Decoder components of the architecture during training. The Decoder may only be used for generation the output text. In some implementations, the large language model may be fine-tuned on specific training information or open-source clinical information, which may improve the quality of the generated content block recommendations described herein.

In some implementations, recommendation generating component 116 may be configured to further provide the categorized entities from the textualized transcript, or segments thereof, of the scheduled visit to the machine learning model subsequent to the generation of the textualized transcript. In some implementations, the note template that the note is based on may be provided with the textualized transcript. Thus, the machine learning model may generate supplemental content block recommendations for the sections of the note template based on the textualized transcript provided. The supplemental content block recommendations may be in addition to the content block recommendations generated based on the information set.

Individual content block recommendations may include a summary of information regarding the categorized entities that is relevant to the first current visit information. The content block recommendations may be in accordance with the recommendation templates provided. The individual content block recommendations may include one or more of textual narratives, charts, tables, images, videos, and/or other content. In some implementations, the individual content block recommendations may be related to the individual entity classes and thus include a summary of the categorized entities for each of the entity classes.

Note generating component 118 may be configured to obtain the content block recommendations for the sections of the note from the machine learning model. In some implementations, note generating component 118 may be configured to obtain the supplemental content block recommendations from the machine learning model. The content block recommendations, and in some implementations, the supplemental content block recommendations, may be transmitted and thus obtained via network 140 that the machine learning model and server(s) 102 are connected through. In some implementations, obtainment of the content block recommendations may be within server(s) 102 upon the machine learning model being stored in electronic storage 132. In some implementations, note generating component 118 may be configured to establish the connection with the machine learning model via the network 140.

Note generating component 118 may be configured to generate the note to include the content block recommendations in the sections of the note. Generating the note may include temporarily populating the content block recommendations under the appropriate sections until receipt of an indication to include the content block recommendations in the note. In some implementations, note generating component 118 may be configured to store the note to electronic storage 132, electronic storage 128, and/or other electronic storage. The note may be stored in the first electronic medical record.

In some implementations, note generating component 118 may be configured to analyze the content block recommendations and supplemental content block recommendations to determine individual relevant scores with respect to the first current visit information. The individual relevant scores may represent whether the individual content block recommendations and supplemental content block recommendations are relevant to the scheduled visit. Note generating component 118 may be configured to determine whether the individual relevant scores exceed a threshold. The threshold may be a numeric control value. The threshold may represent adequate relevance of a given content block recommendation to given current visit information and thus a given scheduled visit. In some implementations, the threshold may be tuned based on evaluating a precision value of the collective content block recommendations and a recall value for the collective content block recommendations. The precision value may represent an amount of the content block recommendations that are correct and accepted as they were generated. The recall value may represent an amount of the content block recommendations that were accepted compared to an amount of the content block recommendations that were generated.

In some implementations, the threshold may be fine-tuned based on evaluations by experiments using the generated content block recommendations. That is, the threshold may be fine-tuned based on acceptance rates of the content block recommendations. A first set of users may be presented content block recommendations and supplemental content block recommendations that are associated with relevant scores relative to a first threshold. A second set of users may be presented content block recommendations and supplemental content block recommendations that are associated with relevant scores relative to a second threshold. Based on acceptance (i.e., addition of) the content block recommendations and the supplemental content block recommendations by the users of the first set and the second set, note generating component 118 may be configured to determine whether the first threshold or the second threshold resulted in more acceptances and thus a higher acceptance rate. Subsequently, the threshold, either the first threshold or the second threshold, with the higher acceptance rate may be implemented.

Presentation component 120 may be configured to effectuate, via client computing platform 104, presentation of the note. In some implementations, presentation of the note may be immediately subsequent to generation. In some implementations, presentation of the note may be upon the user or other users accessing the note stored from the first electronic medical record of the first subject. In some implementations, presentation component 120 may be configured to effectuate, via client computing platform 104, presentation of the supplemental content block recommendations in the note upon obtainment. That is, subsequent to generation of the textualized transcript that represent the utterances during the scheduled visit and obtainment of the supplemental content block recommendations, the supplemental content block recommendations may be populated in the note and presented during the scheduled visit. In some implementations, the supplemental content block recommendations may be presented at different time than the scheduled visit, such as after the scheduled visit.

The individual content block recommendations and the individual supplemental content block recommendations may be presented with addition options. The addition options may be user interface elements, such as virtual buttons or sliders, to accept or deny addition, via user input, of the individual content block recommendations and supplemental content block recommendations in the note under the note sections that they were populated under. That is, the individual content block recommendations and supplemental content block recommendations may not officially be populated in the note to store a finalized note that is accessible by the subject or other users until the user (or other authorized users) provides the user input to accept the addition of or denial of the addition of the individual content block recommendations and supplemental content block recommendations.

The user input may include interaction with user interface elements presented via client computing platform 104 and/or a voice command uttered by the user. The client computing platform 104 may include graphical user interface that may include the one or more user interface elements. The user interface elements may be configured to facilitate user interaction with the user interface, user entry, and/or selection. An individual user interface element may be configured to be selected or manipulated by the users to provide one or more selections, initiate capturing the sounds, terminate capturing of the sounds, suspending capturing of the sounds, among other user input. By way of non-limiting illustration, the user interface elements may include one or more of text input fields, drop down menus, check boxes, display windows, virtual buttons, sliders, and/or other user interface elements. Voice commands may be captured by client computing platform 104. The voice commands may convey the same user interface, user entry, and/or selection with an utterance by the user (e.g., "Suki, accept" as the note type).

In some implementations, the user input provided by the user may move the individual content block recommendations and supplemental content block recommendations to a different note section than it was populated under. Subsequent user input provided may accept and confirm the addition of the content block under the different note section, or deny official population in the note entirely.

In some implementations, entity recognition component 114 may be configured to receive corrections to the content block recommendations. The corrections may include rewording of the textual narratives that includes the categorized entities, removal of information from the summary, addition of information to the summary, and/or other corrections that change the generated summaries. In some implementations, the corrections may be transmitted to and obtained by model training component 108 via network 140 and/or other communication. Thus, trained entity recognition model 124b may be further trained based on the corrections.

Figure 3A:
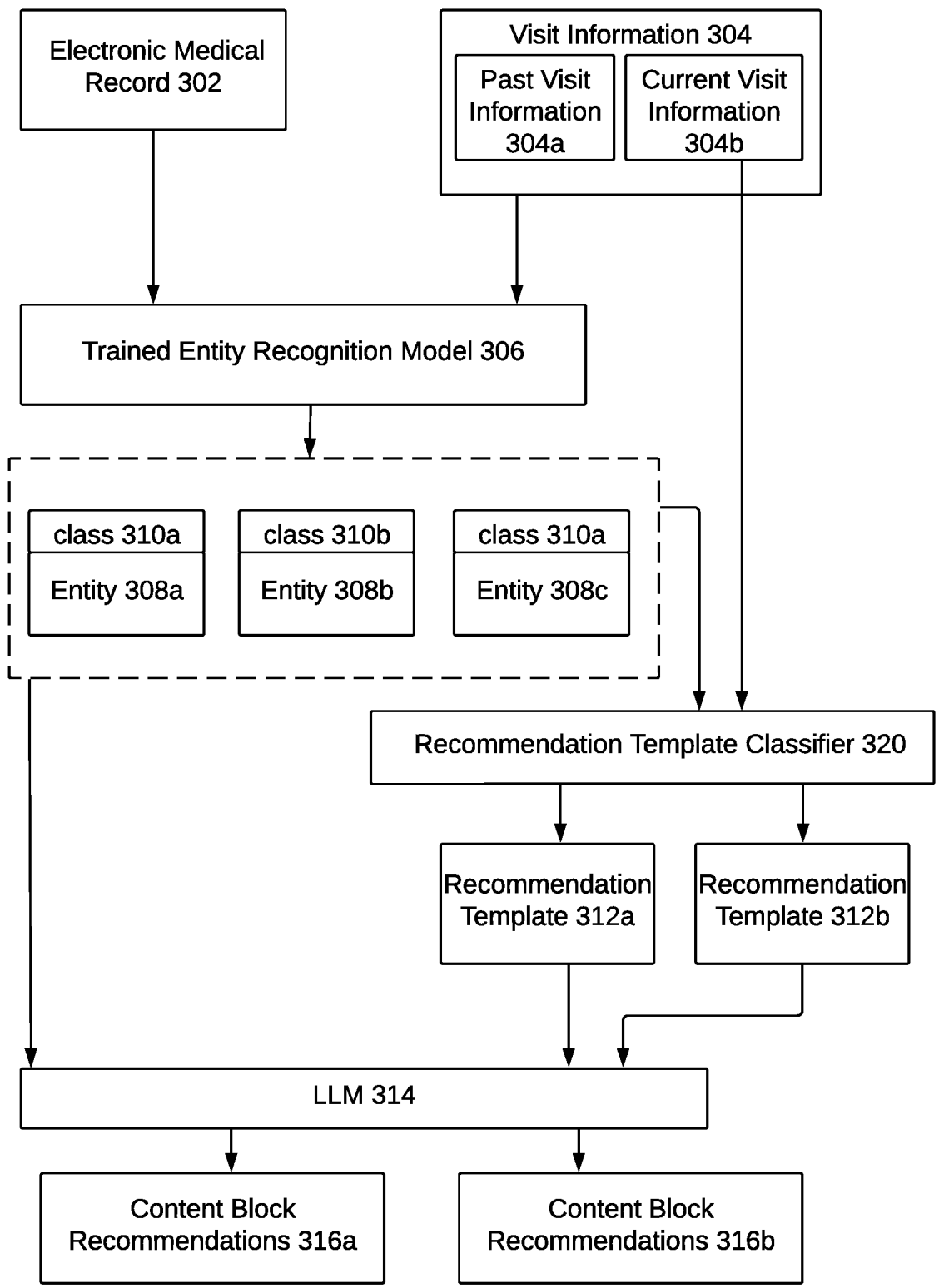
FIG. 3A-B illustrates an example implementation of the system configured to train and utilize an entity recognition model to generate content block recommendations for a note, in accordance with one or more implementations.

FIG. 3A illustrates an electronic medical record 302 for a subject (not illustrated) with an upcoming visit with a caregiver (not illustrated). Electronic medical record 302 may include current and past electronic medical records for the subject. The upcoming visit may be defined by visit information 304. Visit information 304 may include past visit information 304a and current visit information 304b. Current visit information 304a may include a reason of visit and a type of visit. Past visit information 304b may define any past visits of the subject with caregivers, including but not limited to, reasons for the visits, types of visits, notes from the visits, and/or other past visit information. Visit information 304 may be provided to a trained entity recognition model 306 that is trained to identify and categorize entities visit information 304 into different entity classes. Trained entity recognition model 306 may output entities 308a, 308b, and 308c. Entities 308a and 308c may be categorized into entity class 310a, and entity 308b may be categorized into entity class 310b.

Current visit information 304b and entities 308a-c may be provided to a recommendation template classifier 320 that determines recommendation templates 312a and 312b associated with note sections of a note template (not illustrated) for a note 318 (illustrated in FIG. 3B) that documents the upcoming visit. Template recommendations 312a may provide an arrangement for content in a section 320a of note 318 in FIG. 3B. Template recommendations 312b may provide an arrangement for content in a section 320b of note 318 in FIG. 3B.

Template recommendations 312a-b and entities 308a-c in addition to the respective entity classes 310a and 310b may be provided to a large language model (LLM) 314. LLM 314 may determine, based on the information provided to LLM 314, content block recommendations 316a and 316b that include a summary about entities 308a and 308c of entity class 310a and a summary about entities 308b of entity class 310b, respectively. Content block recommendation 316a may be in accordance with template recommendation 312a for section 320a in FIG. 3B, and content block recommendation 316b may be in accordance with template recommendation 312b for section 320b in FIG. 3B. Content block recommendations 316a and 316b may be presented to a user (e.g., the caregiver) within note 318 (see, FIG. 3B).

Figure 3B:
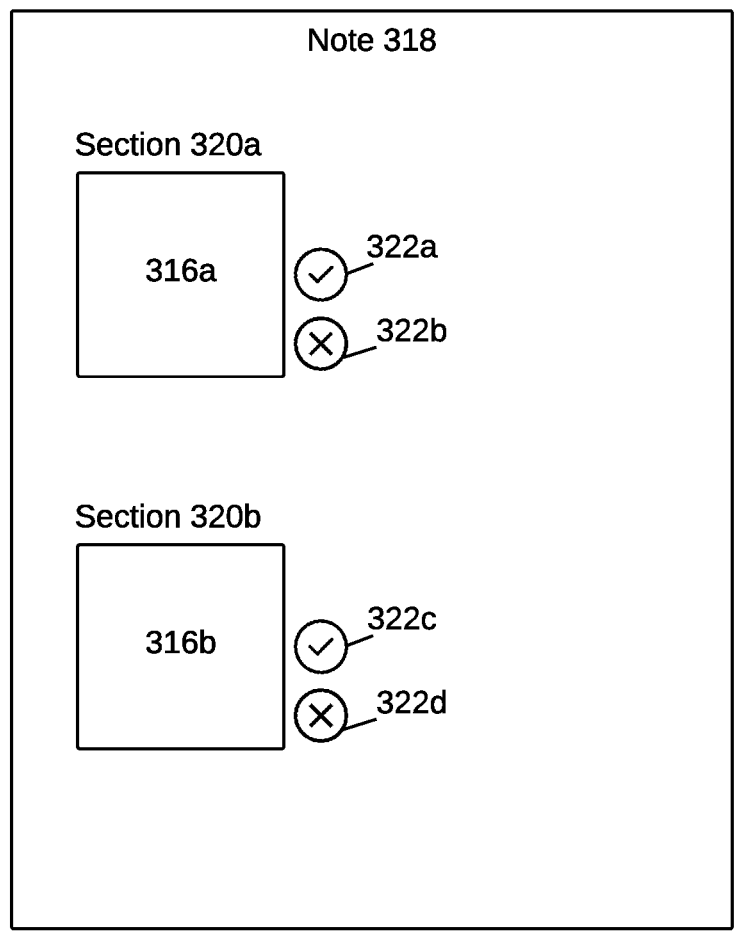

FIG. 3B illustrates note 318 (the same note referenced in FIG. 3A) that includes sections 320a and 320b. Content recommendation block 316a may be appropriately populated under section 320a, and content block recommendation 316b may be appropriately populated under section 320b. User interface elements 322a and 322b may be presented in association with content block recommendation 316a to enable the caregiver or other user to accept or decline, respectively, inclusion of content block recommendation 316a under section 320a. Similarly, user interface elements 322c and 322d may be presented in association with content block recommendation 316b to enable the caregiver or other user to accept or decline, respectively, inclusion of content block recommendation 316b under section 320b.

Referring back to FIG. 1, in some implementations, server(s) 102, client computing platform(s) 104, and/or external resources 130 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 130 may be operatively linked via some other communication media.

A given client computing platform 104 may include one or more processors configured to execute computer program components. The computer program components may be configured to enable an expert or user associated with the given client computing platform 104 to interface with system 100 and/or external resources 130, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 130 may include sources of information outside of system 100, external entities participating with system 100, and/or other resources. In some implementations, some or all of the functionality attributed herein to external resources 130 may be provided by resources included in system 100.

Server(s) 102 may include electronic storage 132, one or more processors 134, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 132 may comprise non-transitory storage media that electronically stores information. The electronic storage media of electronic storage 132 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 132 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 132 may include one or more virtual storage resources (e.g., cloud storage, a virtual private network, and/or other virtual storage resources). Electronic storage 132 may store software algorithms, information determined by processor(s) 134, information received from server(s) 102, information received from client computing platform(s) 104, and/or other information that enables server(s) 102 to function as described herein.

Processor(s) 134 may be configured to provide information processing capabilities in server(s) 102. As such, processor(s) 134 may include one or more of a digital processor, an analog processor, a digital circuit designed to process information, an analog circuit designed to process information, a state machine, and/or other mechanisms for electronically processing information. Although processor(s) 134 is shown in FIG. 1 as a single entity, this is for illustrative purposes only. In some implementations, processor(s) 134 may include a plurality of processing units. These processing units may be physically located within the same device, or processor(s) 134 may represent processing functionality of a plurality of devices operating in coordination. Processor(s) 134 may be configured to execute components 108, 110, 112, 114, 116, 118, 120, and/or 122, and/or other components. Processor(s) 134 may be configured to execute components 108, 110, 112, 114, 116, 118, 120, and/or 122, and/or other components by software; hardware; firmware; some combination of software, hardware, and/or firmware; and/or other mechanisms for configuring processing capabilities on processor(s) 134. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, and/or 122 are illustrated in FIG. 1 as being implemented within a single processing unit, in implementations in which processor(s) 134 includes multiple processing units, one or more of components 108, 110, 112, 114, 116, 118, 120, and/or 122 may be implemented remotely from the other components. The description of the functionality provided by the different components 108, 110, 112, 114, 116, 118, 120, and/or 122 described below is for illustrative purposes, and is not intended to be limiting, as any of components 108, 110, 112, 114, 116, 118, 120, and/or 122 may provide more or less functionality than is described. For example, one or more of components 108, 110, 112, 114, 116, 118, 120, and/or 122 may be eliminated, and some or all of its functionality may be provided by other ones of components 108, 110, 112, 114, 116, 118, 120, and/or 122. As another example, processor(s) 134 may be configured to execute one or more additional components that may perform some or all of the functionality attributed below to one of components 108, 110, 112, 114, 116, 118, 120, and/or 122.

Figure 2:
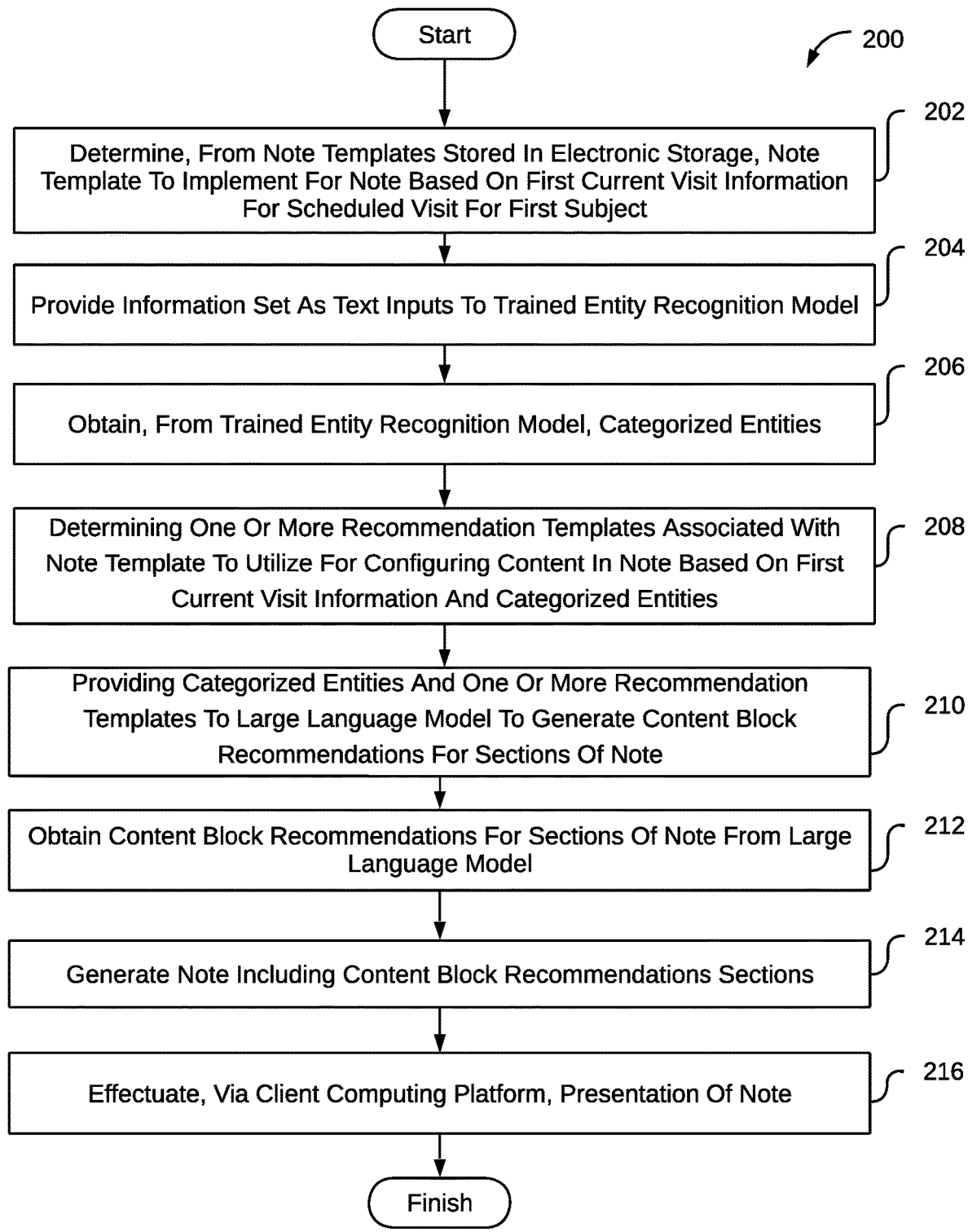
FIG. 2 illustrates a method to utilize an entity recognition model to generate content block recommendations for a note, in accordance with one or more implementations.

FIG. 2 illustrates a method 200 to utilize a trained entity recognition model to generate content block recommendations for a note, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include determining, from note templates stored in electronic storage, a note template to implement for a note based on first current visit information for a scheduled visit for a first subject. Operation 202 may be performed by one or more hardware processors configured by machine-readable instructions including a component that is the same as or similar to note template determining component 112, in accordance with one or more implementations.

An operation 204 may include providing an information set as the text inputs to the trained entity recognition model. The information set may include a first past visit information, the first current visit information, and/or other information. Operation 204 may be performed by one or more hardware processors configured by machine-readable instructions including a component that is the same as or similar to entity recognition component 114, in accordance with one or more implementations.

An operation 206 may include obtaining, from the trained entity recognition model, the categorized entities. Individual ones of the categorized entities may include the entity class and the entity. Operation 206 may be performed by one or more hardware processors configured by machine-readable instructions including a component that is the same as or similar to entity recognition component 114, in accordance with one or more implementations.

An operation 208 may include determining one or more recommendation templates associated with the note template to utilize for configuring content in a note based on the first current visit information, the categorized entities, and/or other information. Operation 208 may be performed by one or more hardware processors configured by machine-readable instructions including a component that is the same as or similar to recommendation generating component 116, in accordance with one or more implementations.

An operation 210 may include providing the categorized entities and the one or more recommendation templates to a large language model to generate content block recommendations for sections of the note. The sections of the note may be based on note sections included in the note template. Operation 210 may be performed by one or more hardware processors configured by machine-readable instructions including a component that is the same as or similar to recommendation generating component 116, in accordance with one or more implementations.

An operation 212 may include obtaining the content block recommendations for the sections of the note from the large language model. Operation 212 may be performed by one or more hardware processors configured by machine-readable instructions including a component that is the same as or similar to note generating component 118, in accordance with one or more implementations.

An operation 214 may include generating the note including the content block recommendations the sections. Operation 214 may be performed by one or more hardware processors configured by machine-readable instructions including a component that is the same as or similar to note generating component 118, in accordance with one or more implementations.

An operation 216 may include effectuating, via a client computing platform, presentation of the note. Operation 216 may be performed by one or more hardware processors configured by machine-readable instructions including a component that is the same as or similar to presentation component 120, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to utilize a trained entity recognition model to generate content block recommendations for a note, the system comprising:

electronic storage that stores (a) a trained entity recognition model, (b) past visit information for past visits of subjects including first past visit information for a first subject, (c) current visit information for scheduled visits that are for the subjects including first current visit information for a scheduled visit for the first subject, (d) entity classes, (e) note templates, and (f) recommendation templates, wherein the trained entity recognition model is configured to identify and categorize entities within text inputs to form categorized entities, wherein the trained entity recognition model is trained based on (i) the entity classes related to a medical knowledge domain, (ii) unformatted text related to the medical knowledge domain, wherein the unformatted text includes transcripts generated based on audio information that represents dictations from users, and typed notes input by the users, and (iii) the entities within the unformatted text categorized in individual ones of the entity classes; and one or more processors configured by machine-readable instructions to:

determine, from the note templates, a note template to implement for a note based on the first current visit information;

provide an information set as the text inputs to the trained entity recognition model, wherein the information set includes the first past visit information and the first current visit information;

obtain, from the trained entity recognition model, the categorized entities, wherein individual ones of the categorized entities include an entity class and an entity;

determine one or more recommendation templates associated with the note template to utilize for configuring content in the note based on the first current visit information and the categorized entities;

provide the categorized entities and the one or more recommendation templates to a large language model to generate content block recommendations for sections of the note, wherein the sections of the note are based on note sections included in the note template;

obtain the content block recommendations for the sections of the note from the large language model;

generate the note to include the content block recommendations in the sections; and effectuate, via a client computing platform, presentation of the note.

2. The system of claim 1, wherein the trained entity recognition model includes a Transformer-based neural network architecture.

3. The system of claim 1, wherein the entity classes include at least complaints, allergies, conditions, medications, procedures, and/or medical devices.

4. The system of claim 1, wherein the electronic medical records include the past visit information and notes related to the past visit information.

5. The system of claim 1, wherein the one or more processors are further configured by the machine-readable instructions to:

obtain, from a user via the client computing platform during the scheduled visit, unstructured textualized notes;

provide the unstructured textualized notes to the trained entity recognition model;

obtain, from the trained entity recognition model, the categorized entities for the unstructured textualized notes;

provide the categorized entities for the unstructured textualized notes and the determined one or more recommendation templates to the large language model to generate supplemental content block recommendations for the sections of the note;

obtain the supplemental content block recommendations from the large language model; and effectuate, via the client computing platform, presentation of the supplemental content block recommendations in the sections of the note.

6. The system of claim 1, wherein the one or more processors are further configured by the machine-readable instructions to:

receive corrections to the content block recommendations, wherein the trained entity recognition model and a recommendation template classification classifier are trained based on the corrections, wherein the determination of the one or more note recommendation templates is performed by recommendation template classifier.

7. A method to utilize a trained entity recognition model to generate content block recommendations for a note, the method comprising:

determining, from note templates stored in electronic storage, a note template to implement for a note based on first current visit information for a scheduled visit for a first subject, wherein the electronic storage further stores (a) a trained entity recognition model, (b) past visit information for past visits of subjects including first past visit information for the first subject, (c) current visit information for scheduled visits that are for the subjects including the first current visit information, (d) entity classes, (e) note templates, and (f) recommendation templates, wherein the trained entity recognition model is configured to identify and categorize entities within text inputs to form categorized entities, wherein the trained entity recognition model is trained based on (i) the entity classes related to a medical knowledge domain, (ii) unformatted text related to the medical knowledge domain, wherein the unformatted text includes transcripts generated based on audio information that represents dictations from users, and typed notes input by the users, and (iii) the entities within the unformatted text categorized in individual ones of the entity classes;

providing an information set as the text inputs to the trained entity recognition model, wherein the information set includes the first past visit information and the first current visit information;

obtaining, from the trained entity recognition model, the categorized entities, wherein individual ones of the categorized entities include an entity class and an entity;

determining one or more recommendation templates associated with the note template to utilize for configuring content in the note based on the first current visit information and the categorized entities;

providing the categorized entities and the one or more recommendation templates to a large language model to generate content block recommendations for sections of the note, wherein the sections of the note are based on note sections included in the note template;

obtaining the content block recommendations for the sections of the note from the large language model;

generating the note to include the content block recommendations in the sections; and effectuating, via a client computing platform, presentation of the note.

8. The method of claim 7, wherein the trained entity recognition model includes a Transformer-based neural network architecture.

9. The method of claim 7, wherein the entity classes include at least complaints, allergies, conditions, medications, procedures, and/or medical devices.

10. The method of claim 7, wherein the electronic medical records include the past visit information and notes related to the past visit information.

11. The method of claim 7, further comprising:

obtaining, from a user via the client computing platform during the scheduled visit, unstructured textualized notes;

providing the unstructured textualized notes to the trained entity recognition model;

obtaining, from the trained entity recognition model, the categorized entities for the unstructured textualized notes;

providing the categorized entities for the unstructured textualized notes and the determined one or more recommendation templates to the large language model to generate supplemental content block recommendations for the sections of the note;

obtaining the supplemental content block recommendations from the large language model; and effectuating, via the client computing platform, presentation of the supplemental content block recommendations in the sections of the note.

12. The method of claim 7, further comprising:

receiving corrections to the content block recommendations, wherein the trained entity recognition model and a template recommendation classification classifier are trained based on the corrections, wherein the determination of the one or more note template recommendations is performed by the template recommendation classifier.

\* \* \* \* \*